Sept. 8, 1942.  A. B. CARLSON  2,295,157
METHOD OF AND APPARATUS FOR PRODUCING SCREEN REPAIR APPARATUS
Filed Nov. 20, 1939

INVENTOR.
ARNOLD B. CARLSON.
BY
ATTORNEY.

Patented Sept. 8, 1942

2,295,157

UNITED STATES PATENT OFFICE 2,295,157

METHOD OF AND APPARATUS FOR PRODUCING SCREEN REPAIR APPARATUS

Arnold B. Carlson, Aurora, Ill.

Application November 20, 1939, Serial No. 305,221

13 Claims. (Cl. 140—3)

This invention relates to a method of and apparatus for producing screen repair units and more particularly to a method of and apparatus for producing improved screen patches for repairing punctured or frayed wire screens, although certain features thereof may be employed for other purposes.

It contemplates more especially the provision of improved wire screen patch production methods which result in an inexpensive, neat, compact, and rugged unit that is readily applicable for efficient and practical attachment over a defective region of a screen without entailing any appreciable time or labor.

One object of the present invention is to provide a simple and novel method of and apparatus for forming an improved screen repair unit.

Another object of the present invention is to provide a simplified and improved apparatus for imbedding a securing device into a screen patch of improved construction.

Still another object is the provision of a novel method for producing an improved screen repair device having spaced securing means associated therewith for superimposed merger with a frayed or punctured wire mesh screen.

A further object is to provide a simple method and apparatus for imbedding ductile securing means in a wire mesh screen repair device for fixed association therewith.

Still a further object is to provide a simple and inexpensive method and apparatus for incorporating metallic pellets possessing ductile characteristics with a wire screen patch at spaced intervals thereon to serve as securing means therefor.

A still further object is to provide an improved method and apparatus for producing a screen repair device which may be readily and conveniently superimposed on a punctured, frayed or torn wire mesh screen to serve as a substantially integral and closely adherent patch therefor.

Other objects and advantages will appear from the following description of an illustrative embodiment of the present invention.

Figure 1:
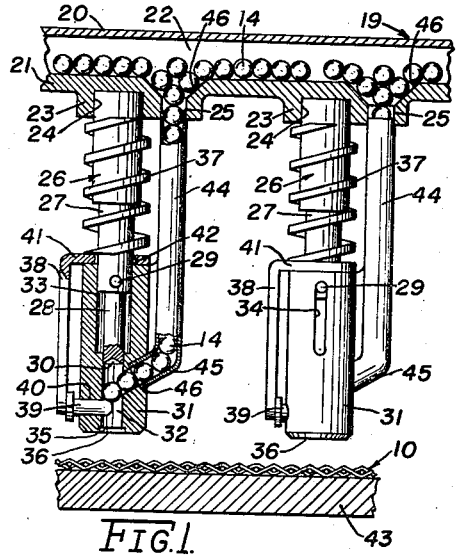
Figure 1 is a front view in elevation showing the placement of ductile pellets and wire mesh screening in the die members prior to the formation of the finished screen repair device, parts thereof being shown in section to clarify the showing.

The article of manufacture that is a product of the method and apparatus selected for illustration, comprises a metallic meshed screen 10 formed by interweaving a plurality of thin, flexible transverse wires 11, which are spaced to present a screen mesh sheet preferably though not essentially corresponding to the common type of wire screening in commercial use. In order that the screen strip 10 may serve to reinforce and cover a punctured, torn or frayed wire screen 12 to form a substantially integral and/or permanent part thereof, a plurality of metallic securing elements or fasteners, in this instance ductile pellets 13, are imbedded at spaced intervals in the screen strip 10.

Figure 4:
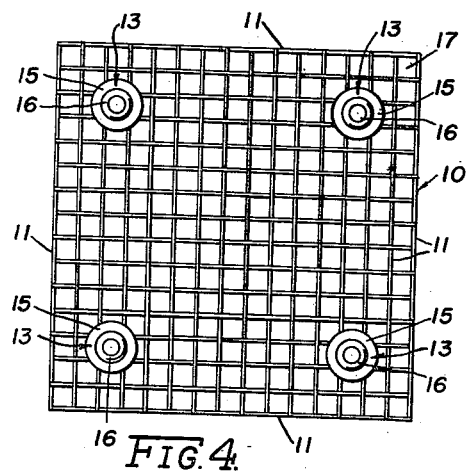
Figure 4 is an enlarged bottom plan view of the finished screen repair device embodying features of the present invention.
Figure 5:
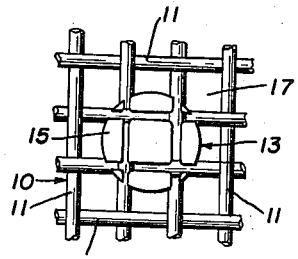
Figure 5 is a top plan view of an enlarged fragmentary section of the device shown in Figure 4, illustrating the bond formed between the wire screening and the securing element.

The fasteners 13 that are preferably though not essentially formed from a spherical pellet 14 such as lead or other suitable ductile metal essentially characterized by its soft, ductile qualities, have a substantially circular base 15 with a frusto-conical lug 16 projecting for a short distance therefrom. It should be noted that the fastener base 15 must be of greater width and area than the corresponding dimensions of any one of the minute spaces 17 in the meshed screen 10. Thus, fasteners 13 will be securely attached to said screen by imbedding a single mesh of wires 11 in fastener base 15 (see Figure 4). This method of securing the fasteners 13 with the wire screen 10 to be more fully described hereinafter, is accomplished by the application of pressure in such a manner that said fasteners are each intimately interlocked and bonded within a single mesh 17 so that they cannot be readily torn from said screen.

The contemplated screen repair strips 10 are produced by a method and apparatus embodying teachings of the present invention. The apparatus capable of performing the method comprises a press element such as a stationary machine member 19 that, in this instance, includes confronting plates 20 and 21 that are complements of each other to define a chamber 22 for the reception of a large number of ductile spherical pellets 14 supplied to and confined in the frame member or housing 19 fixed to a machine frame for support therefrom.

As shown, the lower housing plate 21 is of substantially rectangular configuration formed with depending oblong bosses 23, in this instance constituting a gang of six, which are each recessed as at 24 and 25. The circular recesses 24 receive depending rods 26 that are pressed therein for attachment thereto. It is to be noted that the depending rods 26 terminate in a reduced portion 27 to which is attached a male member, in this instance a die 28, that is riveted or otherwise secured thereto as at 29 to constitute an axial extension of the rods 26 and its reduced portion 27 having a gripping stock provided in the end thereof.

It is to be noted that the lower extremity of the male die 28 is provided with a conical cavity 30 to constitute a forming die of hardened steel or other suitable material to shape the frusto-conical lug 16 of the fasteners 13. The male dies 28 are mounted within female dies and guide members 31 which, in this instance, are of cylindrical configuration and have axial bores 32 and counter bores 33, the former being sized to serve as a complement of the male dies 28 and the latter sized to serve as a complement of the reduced portion 27 of the depending rods 26. The vertical female die members 31 are reciprocally mounted relative to the rods 26 by means of pins 29 that project transversely through the reduced portion 27 of the rods 26 to secure the male die members 28 thereto and also engage vertical slots 34 provided in the offset sides of the female die members 31.

It is to be noted that the lower extremity of the bores 32 in the die members 31 is countersunk to provide a peripheral shoulder 35 that communicates with the lower extremities 36 thereof to constitute a female complement of the die pins 28, the former serving to form within the circular base 15 of the fastener 13. The die pins 28 and their female complement 31 are axially urged relative to each other by means of a helical spring 37 which envelops the depending rods 26 to engage the upper extremity of the female die complement 31; however, in the present embodiment, there is a flat spring 38 disposed in vertical spaced relation with the female die 31 to engage a detent 39 that extends through a transverse aperture 40 which communicates with the axial counter bore 32 in the female die 31.

Consequently, the spring 38 will normally urge the detent 39 inwardly so that its extremity will lie in the path of the counter bore 32 to singly dispense pellets 14 in a manner which will appear more fully hereinafter. As shown, the flat spring 38 has an angularly offset arm 41 which is apertured as at 42 to receive the reduced portion 27 of the depending rods 26, thereby being supported on the upper extremity of the female die 31 with the helical spring 26 pushing thereagainst to retain the female die 31 and the flat springs 38 with its shoulder detent 39 in fixed relation in a downwardly displaced position responsive to the urge of the springs 37.

In order to automatically feed the pellets 14 from the chamber 22 and the housing 19 so that a pellet will be lodged on the screen patch 10 carried by a platen 43 responsive to each pellet deforming operation of the dies 28—31, a tube 44 extends in vertical spaced relation to the depending rods 26 so that its angularly disposed lower extremity 45 is anchored in a correspondingly disposed bore 46 provided in the wall of the female die 31. To this end, the bore 46 only extends into the wall of the female die for a portion of its thickness so as to fixedly receive the annular extremity 45 of the vertical pellet feeding tube 44.

The interior of the tube 44 is sized to correspond substantially with the diameter of the pellets 14; however, such is slightly larger in order to permit the free displacement of the pellets 14 therethrough responsive to the urge of gravity. The pellets 14 in the tube 44 discharge into the axial bore 32 of the female die 31 for normal retention against discharge therefrom by the detent 39 that is normally inwardly displaced responsive to the urge of the flat spring 38. The bore extremity of the feeding tube 44 freely reciprocates in the recess 25 provided in the depending boss 23.

Figures 2, 3:
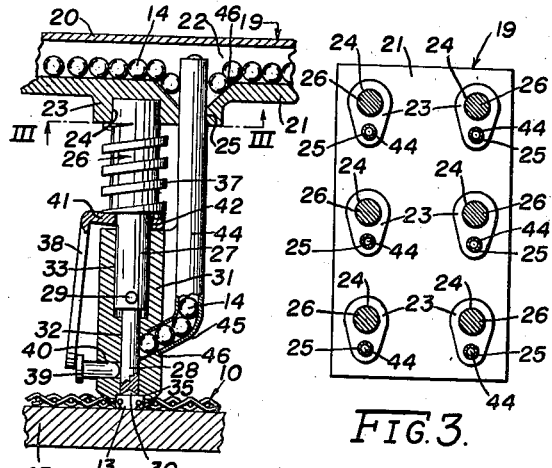
Figure 2 is the same view as Figure 1 showing the simultaneous formation of securing means and their incorporation with the wire screening.
Figure 3 is a sectional view of a bank of pellet forming dies taken substantially along lines III—III of Figure 2.

To this end, the recesses 25 communicate with a divergently flared bore 46 provided in the upper portion of the lower plate 21 of the housing 19 so that the pellets 14 will gravitate to maintain the tube 44 filled with pellets 14. Because the tubes 44 are displaced downwardly with the movement of the female die 31, the upper extremity of the tube 44 is correspondingly displaced within the housing 22 (Figure 2) so that the tube 44 is maintained filled with pellets 14 so long as the housing 19 contains a supply thereof.

It should be noted that the stationary housing 19 with its depending rods 26 are maintained stationary on a die press (not shown) while the platen 43 is upwardly reciprocated within predetermined limits responsive to a driving mechanism of standard construction which is controlled by an attendant through suitable lever means. With the arrangement of parts above described, novel screen patches 10 are provided with an imbedded ductile fasteners 13 by feeding a strip of wire screen 10 into the die press along the top surface of the platen 43. Then the attendant lifts the platen 43 against the female dies 31 by shifting the proper lever controls, thereby locking the female dies 31 for a distance within the limits of the slots 34 thereon against the springs 37 while the die pins remain stationary to displace the lowermost pellet 14 through the axial bore 32 for contact with the screen 10.

The elevation of the female dies 31 and the relative depression of the die pins 28 serves to displace the detent 39 outwardly to allow the lowermost pellet 14 to pass through the mouth 35 of the dies 31. The lowermost pellet 14 and wire screen 10 are then subjected to sufficient pressure between the forming dies 28—31 and cooperating platen 43 to shape the pellets 14 into the above described fasteners 13, and at the same time successively imbed the latter into individual mesh areas 17 of the screen 10 to produce a screen patch described supra.

During this operation, the die pin 28 will close the discharge opening that communicates with the pellet feeding tube 44 and holds the pellets in position therein while the lowermost pellet 14 has been displaced beyond the detent for imbedded engagement with the screen 10 and simultaneous deformation into the fasteners 13. When the platen 43 is withdrawn to its initial downward position, the relative die members 28—31 assume their initial spaced relation responsive to the urge of the springs 37 and thus the next successive pellet 14 is displaced into the axial bore 32 of the female die 31 just after the detent 39 is moved inwardly responsive to the urge of the flat springs 38. Thereupon, the screen strip 10 is moved to another successive position on the platen 10 to embed the pellets 14 and deform them into fasteners 13 in the production of successive screen patches.

While a gang of six die assemblies 26 is preferable though not essential, the number may vary depending upon the dictates of commercial practice. The gang of six is illustrative of the possibility of producing screen patches 10 of different sizes therewith in that a screen patch may be imbedded with two, four, six or any multiple of fasteners 13 by the relative positioning of the screen strip 10 with respect to the dies 31 or an individual die 31 on each housing 19. The housing 19 may be charged with pellets 14 through any suitable opening (not shown), and the formation of the screen patches 10 may be produced in a continuity of production operations in that the strip 10 can be segregated into individual patches after the fasteners 13 have been provided thereon.

Figure 8:
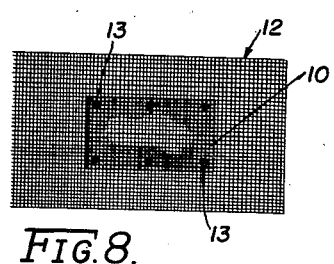
Figure 8 is a top plan view of a wire screen to which a screen repair patch, produced in accordance with the teachings of the present invention, has been applied to a defective region in a screen.

With the arrangement of parts above described, the forming dies 31 are spaced at predetermined intervals in the stationary plate member 21 to imbed or flow a plurality of correspondingly spaced fasteners 13 preferably of ductile metal in the comparatively small strips of screen 10, the strips 10 being produced after cutting larger sheets of wire screen into small, convenient size patches and feeding them through the die press (not shown). A plurality of said patches 10 may then be confined in a container to provide a convenient, inexpensive and saleable screen repair kit for repairing and reinforcing any punctured, torn, rusted or frayed screen 12 (Figure 8) such as commonly used for doors and windows.

When the screen patch 10 is to be applied to a wire screen 12 requiring the necessary aforementioned repairs, a proper sized patch is first selected from the repair kit, or if not available in a kit, then cut to size from a larger sheet so as to effectively cover the damaged portion of said screen. Having provided a suitable supporting surface (not shown) for the damaged part of said screen, the patch 10 is applied so that the projecting fastener lugs 16 will engage the confronting mesh screen. Because of the soft, ductile character of the fasteners 13, they may be readily pressed or hammered into the wire screen 12 in such a manner as to cause the frusto-conical fastener lugs 16 to project into the spaces 17 between the wires 11 forming said screen.

Figure 6:
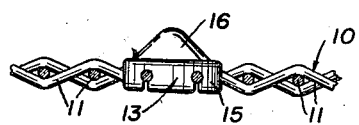
Figure 6 is an enlarged fragmentary view in front elevation of one of the securing elements shown in Figure 4.
Figure 7:
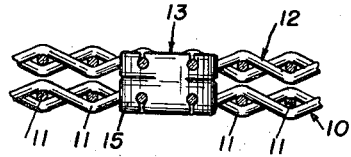
Figure 7 is a front elevation view illustrating the method of fastening screen repair device of the character described to a confronting wire screen.

When the screen is well supported on one side, while the fasteners 13 are pressed or hammered into the screen from the opposite side, the lugs 16 projecting between wires 11 will be spread so as to cause said wires to be securely imbedded therein, thereby forming a closely and intimately interlocked bond between the patch 10 and the screen 12 so that the two become substantially integral and closely adherent (see Figure 6). It is worthy of note that the ductile fasteners 13 function substantially as a soft metal weld between two similar sheets of metal screen and a closely adherent, tightly secured bond is thus established therebetween.

With the teachings of the present invention, an improved and simple screen repair unit is produced which serves as an effective and inexpensive screen patch to be readily applied to any punctured, torn, rusted or frayed screen. Because of its simplicity, effectiveness and low cost, it answers the screen repair problem in every community and results in a neat, permanent patch which will substantially add to the life of the wire mesh screen.

Various changes may be made to the embodiment of the invention herein specifically described without departing from or sacrificing any of the features of the invention, and nothing herein shall be construed as limitations of the invention, its concept or structural embodiment as to the whole or any part thereof except as defined in the appended claims.

I claim:

1. In a device of the character described, the combination with a press element, of complemental male and female die members on said press element, said die members being reciprocally connected relative to each other to deform pellets or the like, means associated with said die members for feeding pellets thereto, a pellet confining housing to direct pellets to said feeding means, and a platen for displacement relative to said die members to effect their relative reciprocation for pellet feeding and deformation.

2. In a device of the character described, the combination with a press element, of complemental male and female die members on said press element, said die members being reciprocally connected relative to each other to deform pellets or the like, means connected to said female die member for feeding pellets thereto, a pellet confining housing to direct pellets to said feeding means, and a platen for displacement relative to said die members to effect their relative reciprocation for pellet feeding and deformation.

3. In a device of the character described, the combination with a press element, of complemental male and female die members on said press element, said die members being reciprocally connected relative to each other to deform pellets or the like, a tubular member connected to the interior of said female die member for feeding pellets thereto, a pellet confining housing to direct pellets to said feeding means, and a platen for displacement relative to said die members to effect their relative reciprocation for pellet feeding and deformation.

4. In a device of the character described, the combination with a press element, of complemental die members on said press element, said die members being movable along an axial path relative to each other to deform pellets or the like, and means associated with said die members for feeding pellets within the axial path of said die members preparatory to their full axial displacement relative to each other.

5. In a device of the character described, the combination with a press element, of complemental die members on said press element, said die members being movable along an axial path relative to each other to deform pellets or the like, and means associated with said die members for gravity feeding pellets within the axial path of said die members preparatory to their full axial displacement relative to each other.

6. In a device of the character described, the combination with a press element, of complemental die members on said press element, said members being movable along an axial path relative to each other to deform pellets or the like, means comunicating with one of said die members for movement therewith to feed pellets within the axial path of said die members preparatory to their full axial displacement relative to each other, and a platen for displacement relative to said die members to effect relative movement of said die members, pellet feeding and deformation.

7. In a device of the character described, the combination with a press element, of complemental die members on said press element, said members being movable along an axial path relative to each other to deform pellets or the like, means communicating with one of said die members for movement therewith to gravity feed pellets therethrough, and a platen for displacement relative to said die members to effect relative movement of said die members, pellet feeding and deformation.

8. In a device of the character described, the combination with a press element, of complemental die members telescopically mounted on said press element, said die members being axially movable relative to each other to deform pellets or the like, means communicating with one of said die members for movement therewith to feed pellets therethrough, and a pellet confining housing communicating with said last named feeding means to direct pellets in the path of said die members.

9. In a device of the character described, the combination with a press element, of complemental die members telescopically mounted on said press element, said die members being axially movable relative to each other to deform pellets or the like, means communicating with one of said die members for movement therewith to feed pellets therethrough, and a stationary pellet confining housing communicating with said last named feeding means movable relative therewith to direct pellets in the path of said die members.

10. In a device of the character described, the combination with a press element, of complemental die members telescopically mounted on said press element, said die members being axially movable relative to each other to deform pellets or the like, means communicating with one of said die members for movement therewith to feed pellets therethrough, a stationary pellet confining housing communicating with said last named feeding means movable relative therewith to direct pellets in the path of said die members, and a platen for displacement relative to said movable die members to effect relative displacement therebetween for pellet feeding and deformation.

11. In a device of the character described, the combination with a press element, of complemental die members on said press element, said die members being movable relative to each other to deform pellets or the like, means associated with said die members for gravity feeding pellets within the axial path of said die members preparatory to their full axial displacement relative to each other, and a detent on one of said die members to control the release of pellets responsive to the relative displacement of said die members.

12. In a device of the character described, the combination with a press element, of complemental die members on said press element, said members being movable along an axial path relative to each other to deform pellets or the like, means communicating with one of said die members for movement therewith to feed pellets within the axial path of said die members preparatory to their full axial displacement relative to each other, a spring impelled detent on one of said die members to control the release of pellets responsive to their relative displacement of said die members, and a platen for displacement relative to said die members to effect relative movement of said die members, pellet feeding and deformation.

13. In a device of the character described, the combination with a press element, of complemental die members on said press element, said members being movable along an axial path relative to each other to deform pellets or the like, means communicating with one of said die members for movement therewith to gravity feed pellets therethrough, means on one of said die members to control the release of pellets responsive to their relative displacement of said die members, and a platen for displacement relative to said die members to effect relative movement of said die members, pellet feeding and deformation.

ARNOLD B. CARLSON.